(12) United States Patent
Kim et al.

(10) Patent No.: US 9,421,843 B2
(45) Date of Patent: Aug. 23, 2016

(54) ACTIVE SUSPENSION APPARATUS FOR VEHICLE AND PUMP APPLIED THERETO

(71) Applicant: MANDO Corporation, Pyeongtaek-si, Gyeonggi-do (KR)

(72) Inventors: Tae Ju Kim, Yongin-Si (KR); Seong Ho Choi, Anyang-Si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/736,249

(22) Filed: Jun. 10, 2015

(65) Prior Publication Data

US 2015/0360531 A1 Dec. 17, 2015

(30) Foreign Application Priority Data

Jun. 11, 2014 (KR) .................. 10-2014-0071068

(51) Int. Cl.
*B60G 17/027* (2006.01)
*B60G 17/033* (2006.01)
*B60G 17/04* (2006.01)
*F16H 25/22* (2006.01)
*B60G 17/02* (2006.01)

(52) U.S. Cl.
CPC .......... *B60G 17/0408* (2013.01); *B60G 17/021* (2013.01); *B60G 17/027* (2013.01); *B60G 17/0272* (2013.01); *B60G 17/033* (2013.01); *F16H 25/2204* (2013.01); *B60G 2204/8102* (2013.01); *B60G 2600/182* (2013.01); *Y10T 74/18656* (2015.01)

(58) Field of Classification Search
CPC ............. B60G 17/021; B60G 17/0272; B60G 17/033; B60G 21/073; B60G 2202/413; B60G 2600/182; B60G 2204/8102; F16H 25/2204; F04B 1/02; F04B 1/124
USPC ................... 280/5.505, 5.5, 124.161, 124.16, 280/124.162; 701/37; 417/534
See application file for complete search history.

(56) References Cited

U.S. PATENT DOCUMENTS

| | | | | |
|---|---|---|---|---|
| 5,015,009 A | * | 5/1991 | Ohyama | B60G 17/0162 280/5.51 |
| 6,000,702 A | | 12/1999 | Streiter | |
| 6,240,348 B1 | * | 5/2001 | Shono | B60G 17/017 280/124.159 |
| 2014/0260233 A1 | * | 9/2014 | Giovanardi | F15B 13/0444 60/431 |

\* cited by examiner

*Primary Examiner* — Keith Frisby
(74) *Attorney, Agent, or Firm* — McDermott Will & Emery LLP

(57) ABSTRACT

An active suspension apparatus for a vehicle includes a pump configured to adjust movements of a fluid and actuators configured to receive the fluid from the pump and to compensate displacements of coil springs connected to wheels of the vehicle, in which the pump supplies the fluid contained in a cylinder to one of the actuators of left wheels of the vehicle and the actuators of right wheels of the vehicle based on the driving of a motor.

8 Claims, 6 Drawing Sheets

ACTIVE SUSPENSION APPARATUS FOR VEHICLE AND PUMP APPLIED THERETO

CROSS-REFERENCE TO RELATED APPLICATION

This application claims priority to and the benefit of Korean Patent Application No. 10-2014-0071068, filed on Jun. 11, 2014 the disclosure of which is incorporated herein by reference in its entirety.

BACKGROUND

1. Field of the Invention

The present invention relates to an active suspension apparatus for a vehicle and a pump applied thereto, and more particularly, to an active suspension apparatus for a vehicle which supplies a fluid to actuators disposed on wheels of the vehicle using a pump driven by a motor and the pump applied thereto.

2. Discussion of Related Art

In vehicles, an active suspension system indicates a system in which sensors sense all types of inputs from a road surface and an electronic control unit (ECU) effectively controls the roll behavior of a vehicle based on the sensed inputs.

In detail, an actuator which compensates a displacement of a coil spring connected to a wheel of the vehicle is provided, a fluid quantity supplied to the actuator is appropriately controlled, changes of the vehicle in roll and pitch are sensed, and a height of the vehicle is constantly maintained, thereby increasing comfortability and a grip force of the vehicle.

In addition, a user may be allowed to set a height of the vehicle depending on wheeling through level-controlling the height of the vehicle or the height of the vehicle may be lowered at a high speed to reduce air resistance, thereby increasing stability in driving and fuel efficiency.

U.S. Pat. No. 6,000,702 discloses an active vehicle suspension system which includes a spring and a lift-adjustable regulating unit connected thereto in series, in which a flow of a fluid supplied to the lift-adjustable regulating unit is controlled by proportional control valves.

However, in such a system described above, it is necessary to use the proportional control value and a hydraulic pump which are expensive. In addition, the hydraulic pump is connected to an engine and always driven in such a way that the pump is constantly driven while the engine is operating. Accordingly, since the pump is always driven to generate a source of high pressure while the engine is operating, an excessive amount unnecessary for the system is needed and an output of the engine is reduced, thereby having a bad effect on fuel efficiency.

CITED REFERENCE

U.S. Pat. Registration Publication No. 6,000,702

SUMMARY OF THE INVENTION

The present invention is directed to an active suspension apparatus in which expensive proportion control valves are not applied to reduce manufacturing costs and to simplify a configuration.

The present invention is also directed to an active suspension apparatus capable of minimizing energy consumption using a motor-and-cylinder-based pump.

The technical objectives of the present invention are not limited to the above disclosure; other objectives not mentioned above may become apparent to those of ordinary skill in the art based on the following descriptions.

According to an aspect of the present invention, there is provided an active suspension apparatus for a vehicle, including a pump configured to adjust movements of a fluid and actuators configured to receive the fluid from the pump and to compensate displacements of coil springs connected to wheels of the vehicle, in which the pump supplies the fluid contained in a cylinder to one of the actuators of left wheels and the actuators of right wheels based on the driving of a motor.

The pump may include a first ball screw and a second ball screw configured to be disposed on one side and the other side of the cylinder, respectively, and to be rotated based on the driving of the motor, and a first piston and a second piston configured to linearly reciprocate inside the cylinder based on the rotation of the first ball screw and the second ball screw.

The first ball screw and the second ball screw may be rotated on the same shaft. When the first ball screw and the second ball screw are rotated in one of one direction and the other direction by the driving of the motor, the first piston and the second piston may move toward one of the one side and the other side of the cylinder and supply the fluid contained in one of the one side and the other side of the cylinder to one of the actuators of the left wheels and the actuators of the right wheels.

The pump may further include a restoring unit configured to support at least one of the first piston and the second piston.

The active suspension apparatus may further include valves configured to open and close flow channels between the pump and the actuators.

According to another aspect of the present invention, there is provided a pump of an active suspension apparatus for a vehicle, the pump including a motor, a first ball screw and a second ball screw configured to be disposed on one side and the other side of a cylinder, respectively, and to be rotated based on the driving of the motor, and a first piston and a second piston configured to linearly reciprocate inside the cylinder based on the rotation of the first ball screw and the second ball screw.

A fluid contained in the cylinder may be supplied to one of actuators of left wheels of the vehicle and actuators of right wheels of the vehicle based on the driving of the motor.

The first ball screw and the second ball screw may be rotated on the same shaft. When the first ball screw and the second ball screw are rotated in one of one direction and the other direction by the driving of the motor, the first piston and the second piston may move toward one of the one side and the other side of the cylinder and supply the fluid contained in one of the one side and the other side of the cylinder to one of the actuators of the left wheels and the actuators of the right wheels.

The pump may further include a restoring unit configured to support at least one of the first piston and the second piston.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
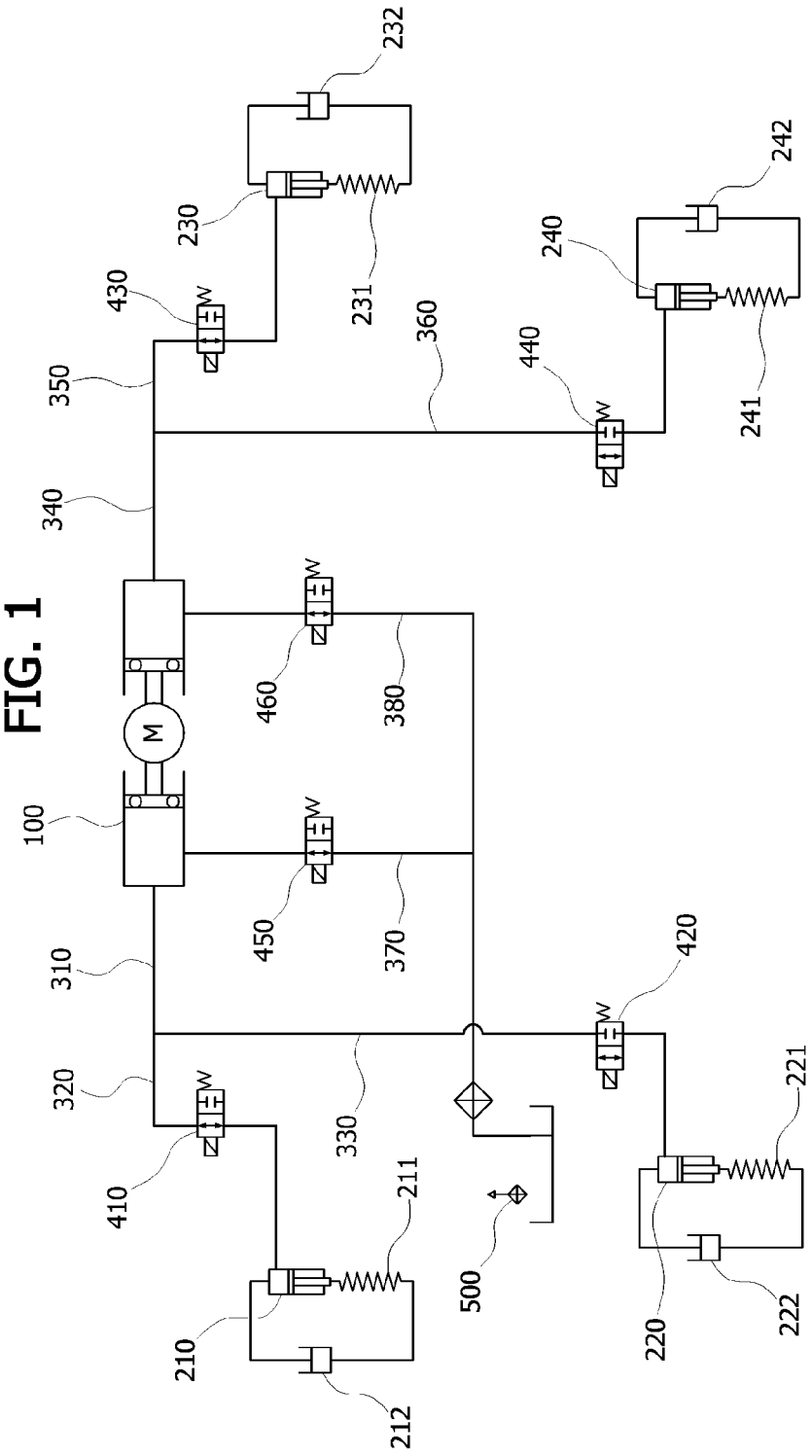
FIG. 1 is a circuit diagram of an active suspension apparatus for a vehicle according to an embodiment of the present invention.

Exemplary embodiments of the present invention will be described with reference to the drawings. Throughout the specification, like reference numerals designate like elements and a repetitive description thereof will be omitted.

While describing the embodiments, when it is determined that a detailed description of publicly known related art may make the points of the present embodiment unclear, the detailed description thereof will be omitted. Also, the attached drawings are only to allow the concept of the present invention to be easily understood. However, it will be understood that the concept of the present invention is not limited by the attached drawings.

Hereinafter, an active suspension apparatus for a vehicle according to an embodiment of the present invention will be described with reference to FIGS. 1 and 2. FIG. 1 is a circuit diagram of the active suspension apparatus according to an embodiment of the present invention.

As shown in FIG. 1, the active suspension apparatus may include a pump 100, actuators 210, 220, 230, and 240, flow channels 310, 320, 330, 340, 350, and 360, valves 410, 420, 430, and 440, and a fluid reservoir 500.

The pump 100 is a configuration for generating hydraulic pressure to a fluid used for the active suspension apparatus, which adjusts movements of the fluid in the apparatus and is driven using a motor 110. In general, a pump in an active suspension apparatus for a vehicle is a hydraulic pump, connected to an engine, and always driven, thereby generating unnecessary pressure. However, when the configuration in which the pump 100 is driven by the motor 110 is applied, since an electronic control unit transmits a signal to the motor 110 when necessary to selectively drive the pump 100, an output of the engine is reduced and fuel efficiency is improved. A detailed configuration of the pump 100 will be described below.

The actuators 210, 220, 230, and 240, as shown in FIG. 1, are connected to coil springs 211, 221, 231, and 241 in series, receive the fluid from the pump 100 to compensate displacements of the coil springs 211, 221, 231, and 241, may be disposed on a left front wheel, a left rear wheel, a right front wheel, and a right rear wheel of the vehicle, respectively, and may be disposed only on the left and right front wheels or on the left and right rear wheels. Particularly, the pump 100 may supply the fluid contained in a cylinder 120 to the actuators 210 and 220 of the left wheels or the actuators 230 and 240 of the right wheels. Also, the actuators 210, 220, 230, and 240 may be connected to dampers 212, 222, 232, and 242 to absorb shocks which occur while the vehicle is driving.

Meanwhile, between the pump 100 and the actuators 210, 220, 230, and 240, the flow channels 310, 320, 330, 340, 350, and 360 for movements of the fluid are formed. The valves 410, 420, 430, and 440 which control a flow of the fluid in the flow channels 310, 320, 330, 340, 350, and 360 by opening and closing the flow channels 310, 320, 330, 340, 350, and 360 may be further included. The electronic control unit, when necessary, controls not only the driving of the motor 110 for the pump 100 but also the opening and closing of the valves 410, 420, 430, and 440, thereby appropriately supplying the fluid to the actuators 210, 220, 230, and 240 disposed on the left front/rear wheels or the right front/rear wheels of the vehicle. Particularly, on/off valves are applied to the active suspension apparatus instead of proportional control valves and operations of the on/off valves are controlled by the electronic control unit, thereby selectively controlling the movements of the fluid. Through this, a system configuration may be simplified and manufacturing costs may be reduced.

Also, the active suspension apparatus may further include the fluid reservoir 500. When the flow of the fluid in the active suspension apparatus exceeds, the fluid reservoir 500 contains and stores the exceeding flow of the fluid. When it is necessary to supply a more flow of the fluid to the actuators 210, 220, 230, and 240, the fluid reservoir 500 supplies the fluid to each of the actuators 210, 220, 230, and 240 or the pump 100. Between the fluid reservoir 500 and the pump 100, additional flow channels 370 and 380 may be further formed and additional valves 450 and 460 which open and close the flow channels 370 and 380 may be further provided.

Hereinafter, referring to FIGS. 2 to 4, a configuration and operation of the pump 100 of the active suspension apparatus will be described in detail. FIGS. 2 and 3 are a perspective view and a top view of the pump 100 in the active suspension apparatus according to an embodiment of the present invention. FIG. 4 is a cross-sectional view illustrating a portion taken along line A-A in FIG. 3.

In the active suspension apparatus, the pump 100 is a linear cylinder type pump driven by the motor 110 and includes the motor 110, the cylinder 120, a first ball screw 131, a second ball screw 132, a first piston 141, and a second piston 142.

The first ball screw 131 and the second ball screw 132 are disposed on one side and the other side of the cylinder 120 respectively and are rotated in the cylinder 120 based on the driving of the motor 110. The first piston 141 and the second piston 142 linearly reciprocate inside the cylinder 120 based on the rotation of the first ball screw 131 and the second ball screw 132. In detail, threads are formed on outer circumferences of the first ball screw 131 and the second ball screw 132 and grooves corresponding to the threads are formed on inner circumferences of a first ball nut 181 and a second ball nut 182 disposed corresponding to the first ball screw 131 and the second ball screw 132, thereby screw-coupling the first ball screw 131 and the second ball screw 132 with the first ball nut 181 and the second ball nut 182, respectively. Accordingly, when the first ball screw 131 and the second ball screw 132 are rotated by the motor 110, the first ball nut 181 and the second ball nut 182 linearly move toward the cylinder 120, thereby allowing the first piston 141 and the second piston 142 supported by the first ball nut 181 and the second ball nut 182 to reciprocate inside the cylinder 120.

Meanwhile, the first ball screw 131 and the second ball screw 132 are rotated on the same shaft, in which the first ball screw 131 and the second ball screw 132 share a shaft which transfers a rotational force of the motor 110. Through this, rotations of the first ball screw 131 and the second ball screw 132 are performed at the same speed. Also, when the first ball screw 131 and the second ball screw 132 are rotated in one direction due to the driving of the motor 110, the first piston 141 and the second piston 142 move toward the one side of the cylinder 120 and discharge the fluid contained in the one side of the cylinder 120 through a first outlet 161, thereby supplying the fluid to one of the actuators 210 and 220 on the left wheels and the actuators 230 and 240 on the right wheels. On the other hand, when the first ball screw 131 and the second ball screw 132 are rotated in the other direction due to the driving of the motor 110, the first piston 141 and the second piston 142 move toward the other side of the cylinder 120 and discharge the fluid contained in the other side of the cylinder 120 through a second outlet 162, thereby supplying the fluid to the other of the actuators 210 and 220 on the left wheels and the actuators 230 and 240 on the right wheels. That is, it is necessary for the first ball screw 131 and the second ball screw 132 to be rotated by the driving of the motor 110 to allow the first piston 141 and the second piston 142 to linearly move in the same direction.

Meanwhile, the active suspension apparatus may further include restoring units 150 which support at least one of the first piston 141 and the second piston 142. The restoring units 150 are a kind of a component which performs a return spring function. As shown in FIG. 4, the restoring units 150 are disposed between an inner end of the one side of the cylinder 120 and the first piston 141 and between an inner end of the other side of the cylinder 120 and the second piston 142, thereby maintaining the first piston 141 and the second piston 142 to be appropriately supported inside the cylinder 120.

Figure 2:
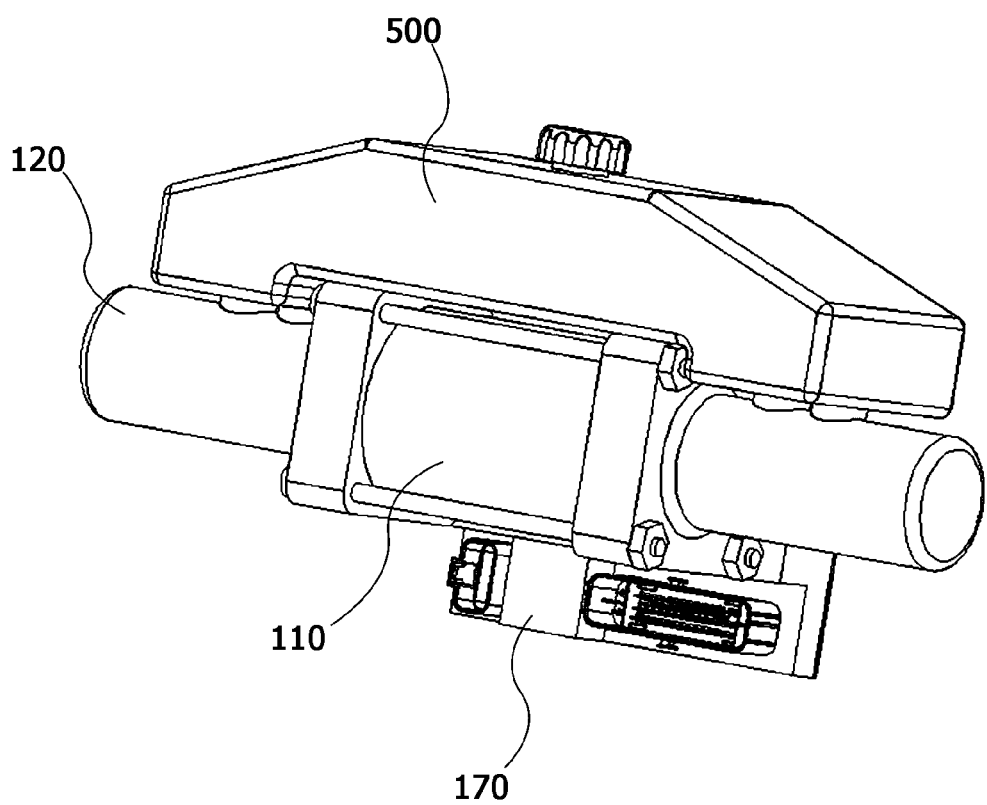
FIGS. 2 and 3 are a perspective view and a top view of a pump in the active suspension apparatus according to an embodiment of the present invention.
Figure 3:
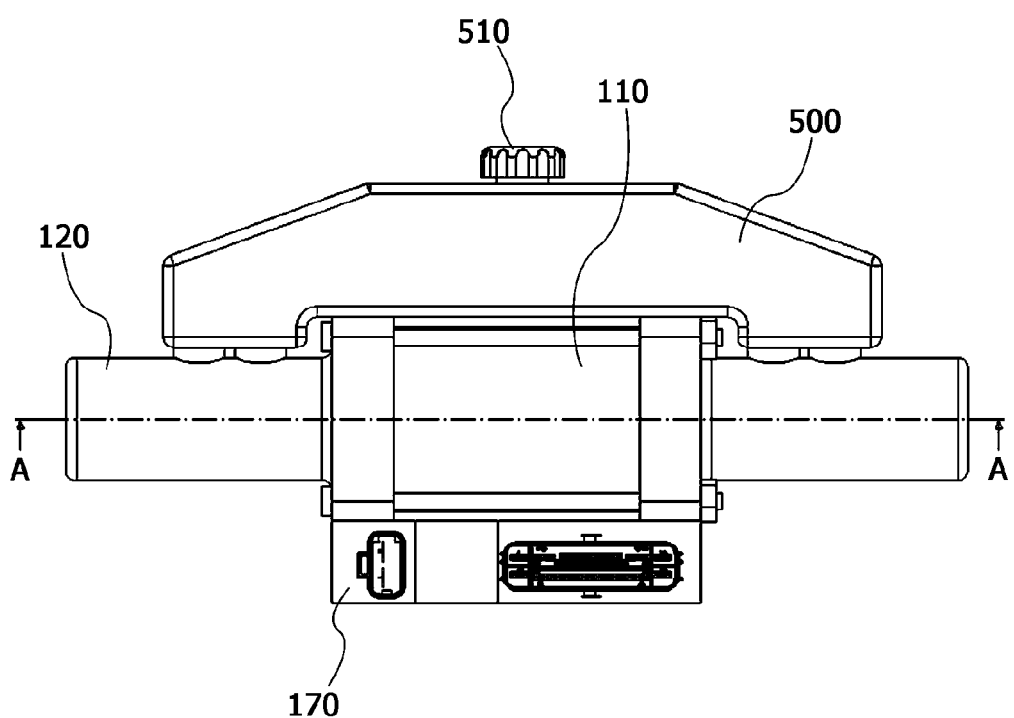
Figure 4:
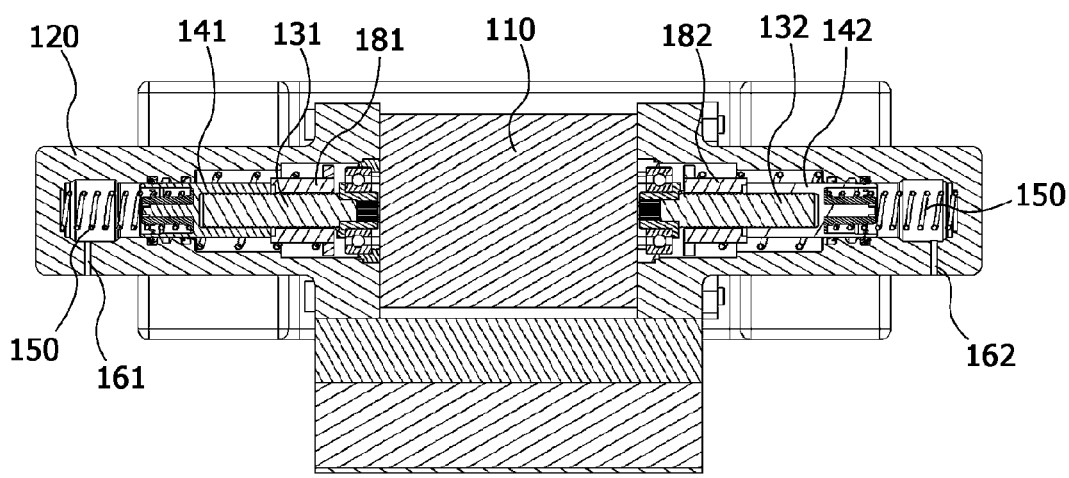
FIG. 4 is a cross-sectional view illustrating a portion taken along line A-A in FIG. 3.

Also, as shown in FIGS. 2 and 3, the fluid reservoir 500 may be formed together with the pump 100 as a single body, in which the additional valves 450 and 460 are also formed together with the pump 100 as a single body. Meanwhile, the fluid reservoir 500 may include an inlet through which the fluid is injected from the outside and may include a cap member 510 capable of closing the inlet.

Meanwhile, since the pump 100 of the active suspension apparatus is controlled by the electronic control unit as described above, a connection unit 170 which includes a connection terminal for receiving a signal from the electronic control unit and a power supply terminal for driving the motor 110 may be included as shown in FIGS. 2 and 3.

Figure 5:
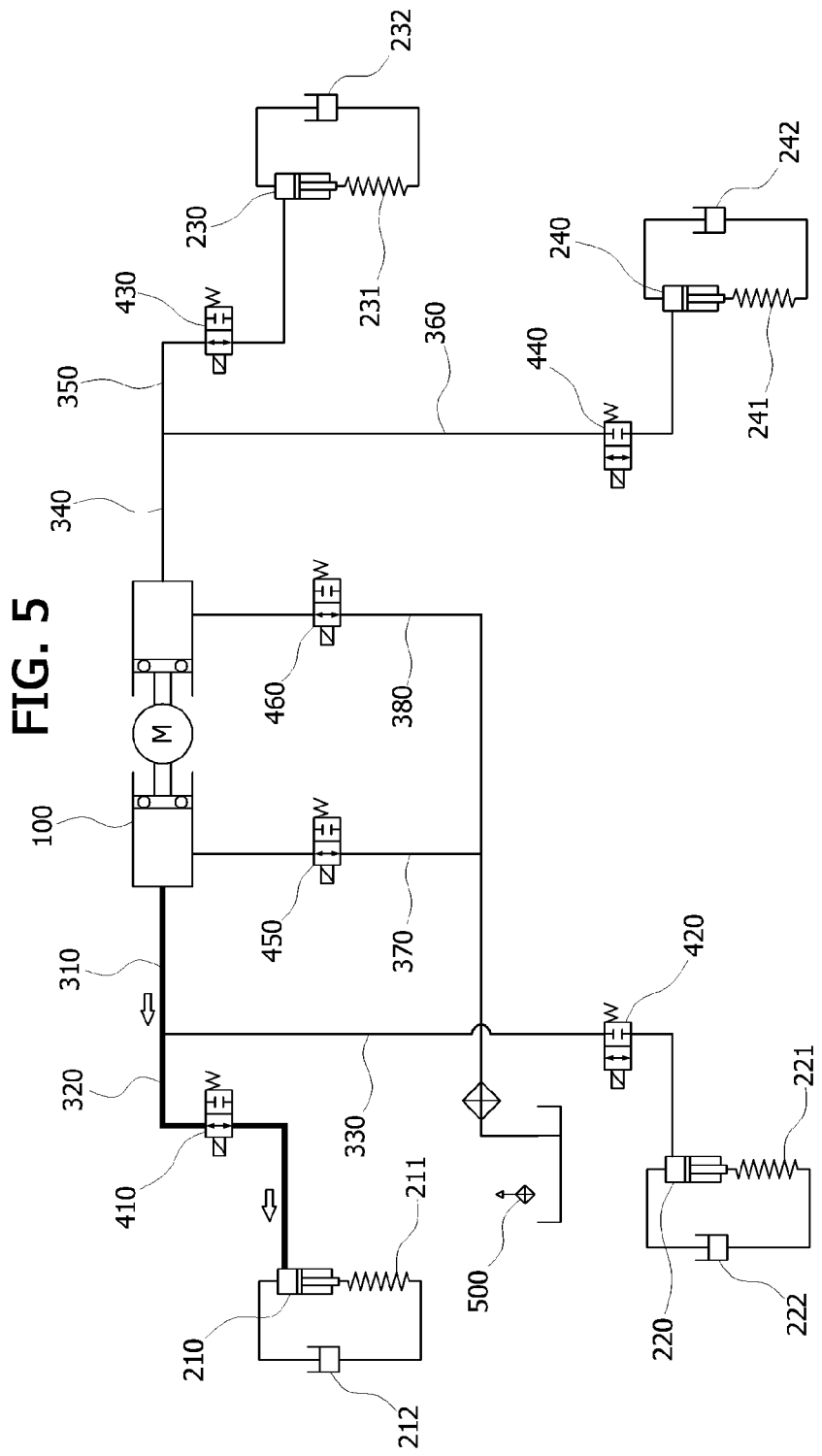
FIGS. 5 and 6 are circuit diagrams illustrating situational flows of a fluid in the active suspension apparatus according to an embodiment of the present invention.
Figure 6:
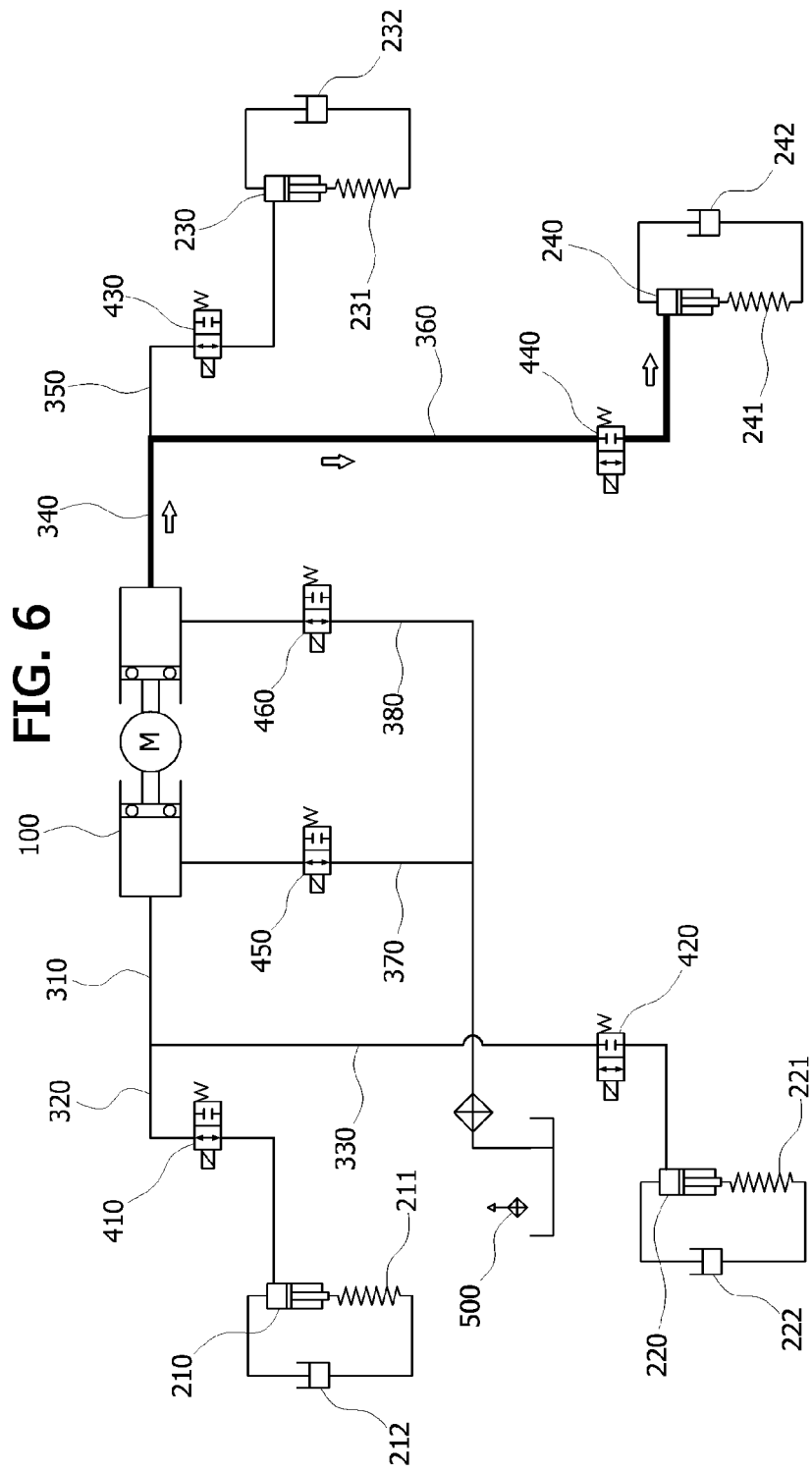

Hereinafter, the movement of the fluid depending on the driving of the pump 100 in the active suspension apparatus will be described with reference to FIGS. 5 and 6. FIGS. 5 and 6 are circuit diagrams illustrating situational flows of the fluid in the active suspension apparatus according to an embodiment of the present invention.

Referring to FIG. 5, a flow of the fluid when the fluid is supplied to the actuators 210 and 220 of the left wheels of the vehicle will be described. The electronic control unit controls the operation of the pump 100 based on road surface information input from sensors of the vehicle or settings of a user. In detail, the electronic control unit rotates the first ball screw 131 and the second ball screw 132 in the one direction by driving the motor 110, thereby moving the first piston 141 and the second piston 142 toward the one side of the cylinder 120. Here, the fluid contained inside the one side of the cylinder 120 is discharged by pressure generated by the first piston 141 to a 1-1 flow channel 310 through the first outlet 161. The 1-1 flow channel 310 is diverged into a 1-2 flow channel 320 connected to the actuator 210 of the left front wheel of the vehicle and a 1-3 flow channel 330 connected to the actuator 220 of the left rear wheel. A first valve 410 and a second valve 420 which control opening and closing of each flow channel are disposed on the 1-2 flow channel 320 and the 1-3 flow channel 330, respectively. The first valve 410 and the second valve 420 are controlled by the electronic control unit. As shown in FIG. 5, the first valve 410 and the second valve 420 are controlled only to open the 1-2 flow channel 320 when the fluid is supplied only to the actuator 210 of the left front wheel and are controlled only to open the 1-3 flow channel 330 when the fluid is supplied only to the actuator 220 of the left rear wheel. In addition, when the fluid is supplied to the actuator 210 of the left front wheel and the actuator 220 of the left rear wheel at the same time, it is necessary to control the first valve 410 and the second valve 420 to open the 1-2 flow channel 320 and the 1-3 flow channel 330 at the same time. Generally, to control a plurality of actuators using one pump, it is necessary to increase a capacity of the pump. However, considering there is a limitation on an increase of the capacity of the pump due to a limitation on an output of a motor, in the active suspension apparatus, the first valve 410 and the second valve 420 may be controlled to supply only to one of the actuator 210 of the left front wheel and the actuator 220 of the left rear wheel.

Referring to FIG. 6, a flow of the fluid when the fluid is supplied to the actuators 230 and 240 of the right wheels of the vehicle will be described. The electronic control unit controls the operation of the pump 100 based on road surface information input from the sensors of the vehicle or settings of the user. In detail, the electronic control unit rotates the first ball screw 131 and the second ball screw 132 in the other direction by driving the motor 110, thereby moving the first piston 141 and the second piston 142 toward the other side of the cylinder 120. Here, the fluid contained inside the other side of the cylinder 120 is discharged by pressure generated by the second piston 142 to a 2-1 flow channel 340 through the second outlet 162. The 2-1 flow channel 340 is diverged into a 2-2 flow channel 350 connected to the actuator 230 of the right front wheel of the vehicle and a 2-3 flow channel 360 connected to the actuator 240 of the right rear wheel. A third valve 430 and a fourth valve 440 which control opening and closing of each flow channel are disposed on the 2-2 flow channel 350 and the 2-3 flow channel 360, respectively. The third valve 430 and the fourth valve 440 are controlled by the electronic control unit. As shown in FIG. 6, the third valve 430 and the fourth valve 440 are controlled only to open the 2-2 flow channel 350 when the fluid is supplied only to the actuator 230 of the right front wheel and are controlled only to open the 2-3 flow channel 360 when the fluid is supplied only to the actuator 240 of the right rear wheel. In addition, when the fluid is supplied to the actuator 230 of the right front wheel and the actuator 240 of the right rear wheel at the same time, it is necessary to control the third valve 430 and the fourth valve 440 to open the 2-2 flow channel 350 and the 2-3 flow channel 360 at the same time. Generally, to control a plurality of actuators using one pump, it is necessary to increase a capacity of the pump. However, considering there is a limitation on an increase of the capacity of the pump due to a limitation on an output of a motor, in the active suspension apparatus, the third valve 430 and the fourth valve 440 may be controlled to supply only to one of the actuator 230 of the right front wheel and the actuator 240 of the right rear wheel.

A pump of an active suspension apparatus according to another embodiment of the present invention includes the motor 110, the first ball screw 131 and the second ball screw 132 disposed on one side and the other side of the cylinder 120 and rotated based on the driving of the motor 110, and the first piston 141 and the second piston 142 which linearly reciprocate inside the cylinder 120 based on the rotation of the first ball screw 131 and the second ball screw 132.

Particularly, the fluid contained in the cylinder 120 is supplied to the actuators 210 and 220 of the left wheels or the actuators 230 and 240 of the right wheels based on the driving of the motor 110. Also, when the first ball screw 131 and the second ball screw 132 are rotated on the same shaft and rotated in one direction or the other direction by the driving of the motor 110, the first piston 141 and the second piston 142 move toward one side or the other side of the cylinder 120 and supply the fluid contained in the one side or the other side of the cylinder 120 to the actuators 210 and 220 of the left wheels or the actuators 230 and 240 of the right wheels. In addition, the pump of the active suspension apparatus according to another embodiment of the present invention may further include the restoring units 150 which support at least one of the first piston 141 and the second piston 142. Since the components have been described in the above, a repetitive description thereof will be omitted.

According to one embodiment of the present invention, an active suspension apparatus for a vehicle is embodied using a motor-and-cylinder-based pump, in which since the pump is operated by driving a motor in a system only when necessary, it is possible to timely generate only necessary pressure, thereby increasing an output of an engine and improving fuel efficiency.

In addition, since on/off valves are applied instead of proportional control valves as valves for controlling movements of a fluid, not only competitiveness in manufacturing costs but also overall simplification of the system may be provided.

The effects of the present invention are not limited to the above disclosure; other effects not mentioned above may become apparent to those of ordinary skill in the art based on the above-described descriptions.

The embodiments and the attached drawings are merely examples which exemplarily illustrate a part of the technical concept of the present invention. Accordingly, since the embodiments disclosed herein are not to limit the technical concept of the present invention but to describe the same, it is obvious that the scope of the technical concept of the present invention is not limited to the embodiments. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An active suspension apparatus for a vehicle, comprising:
    a pump having a motor and configured to adjust movements of a fluid; and
    actuators configured to receive the fluid from the pump and to compensate displacements of coil springs connected to wheels of the vehicle,
    wherein the pump supplies the fluid contained in a cylinder to one of the actuators of left wheels of the vehicle and the actuators of right wheels of the vehicle based on driving of the motor.

2. The active suspension apparatus of claim 1, wherein the pump comprises:
    a first ball screw and a second ball screw disposed on one side and another side of the cylinder, respectively, and rotating based on the driving of the motor; and
    a first piston and a second piston linearly reciprocating inside the cylinder based on the rotation of the first ball screw and the second ball screw.

3. The active suspension apparatus of claim 2, wherein the first ball screw and the second ball screw are rotated on the same shaft, and
    wherein when the first ball screw and the second ball screw are rotated in one of one direction and another direction by the driving of the motor, the first piston and the second piston move toward one of the one side and the other side of the cylinder and supply the fluid contained in one of the one side and the other side of the cylinder to one of the actuators of the left wheels and the actuators of the right wheels.

4. The active suspension apparatus of claim 2, wherein the pump further comprises a restoring unit supporting at least one of the first piston and the second piston.

5. The active suspension apparatus of claim 1, further comprising valves opening and closing flow channels between the pump and the actuators.

6. The active suspension apparatus of claim 1, the pump further comprises:
    a first ball screw and a second ball screw disposed on one side and another side of the cylinder, respectively, and rotating based on the driving of the motor; and
    a first piston and a second piston linearly reciprocating inside the cylinder based on the rotation of the first ball screw and the second ball screw.

7. The active suspension apparatus of claim 6, wherein the first ball screw and the second ball screw rotate on the same shaft, and
    wherein when the first ball screw and the second ball screw rotate in one of one direction and another direction by the driving of the motor, the first piston and the second piston move toward one of the one side and the other side of the cylinder and supply a fluid contained in one of the one side and the other side of the cylinder to one of actuators of the left wheels of the vehicle and actuators of the right wheels of the vehicle.

8. The active suspension apparatus of claim 6, further comprising a restoring unit supporting at least one of the first piston and the second piston.

* * * * *